Patented Nov. 16, 1926.

1,607,459

UNITED STATES PATENT OFFICE.

OTTO JOHANNSEN AND OTTO GROSS, OF VOLKLINGEN-ON-THE-SAAR, GERMANY.

PRODUCTION OF HYDRATED OLEFINES.

No Drawing. Application filed December 2, 1925, Serial No. 72,806, and in Germany August 23, 1924.

The production of alcohol from lighting-gas and other gases containing ethylene is an old problem. Its solution was undertaken by the way of ethyl-sulphuric acid. But hitherto all attempts to carry out this process practically have ended in failure.

On account of these difficulties experiments have been latterly made for attaining the said end through the medium of ethyl-chloride.

The present invention now starts from the fact well-known in theory that water may be directly combined with ethylene according to the equation:

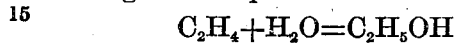
$$C_2H_4 + H_2O = C_2H_5OH$$

But there have been no practical results so far.

Now we have found that ethylene and water combine with a considerable yield of alcohol and without detrimental side reactions under considerable pressure and heat and that a little acidulation of the water is favorable thereto.

2.0 g. of previously liquefied ethylene with 10 ccm. of diluted hydrochloric acid of 4.3% heated to 220° C. in a pressure tube having a total volume of 40 ccm. yielded 2.07 g. of alcohol, corresponding to 63% of the theory.

The hydrochloric acid may be replaced by sulfuric acid or phosphoric acid.

If the amount of water is diminished ethyl-ether is formed besides the alcohol, as the equilibrium

$$2C_2H_5OH \rightleftharpoons (C_2H_5)_2O + H_2O$$

is established. The process may therefore be used for the production of ether too. The minimum of pressure is 20 atm. It is preferable to apply higher pressures to shorten the reaction and to obtain water in the liquid phase capable to take up the generated alcohol. The water is preferably heated before entering the apparatus and acidulated.

For the technical execution of the process in question the olefines are first separated by liquefaction or otherwise from coke-oven gases or other gases and then heated in autoclaves or systems of tubes with water under pressure to temperatures of 150° to 250° C. at a pressure of at least 20 atm. It is preferable to have a higher pressure, as the reaction is shortened thereby and the water may be in liquid form to take up the produced alcohol. The ether may be easily separated from the produced mixture. The product may be further treated in a well known way by distillation and rectification.

The remaining weak acid is returned to the circulation after the introduction of a new quantity of water.

What we claim and desire to protect by Letters Patent is:

1. The process for the production of a hydration product of an olefine which comprises heating the olefine in the presence of water to a temperature not below the boiling point of water while under pressure not substantially less than 20 atmospheres.

2. The process for the production of a hydration product of an olefine which comprises heating the olefine to a temperature not substantially below 150° C. in the presence of water while under a pressure not substantially less than 20 atmospheres.

3. The process for the production of a hydration product of an olefine which comprises heating the olefine to a temperature of from approximately 150° C. to approximately 250° C. in the presence of water while under a pressure not substantially less than 20 atmospheres.

4. The process for the production of a hydration product of an olefine which comprises heating the olefine to a temperature not substantially below 150° C. in the presence of water vapor and under a pressure capable of maintaining a part of the water in the liquid phase.

5. The process for the production of a hydration product of an olefine which comprises heating the olefine to a temperature not substantially below 150° C. in the presence of water vapor and under a pressure not substantially less than 20 atmospheres capable of maintaining a part of the water in the liquid phase.

In testimony whereof we have affixed our signatures.

OTTO JOHANNSEN.
OTTO GROSS.